United States Patent

Hood, Jr. et al.

[15] 3,699,629

[45] Oct. 24, 1972

[54] ELECTRICAL COMPONENT INSERTION-REMOVAL TOOL

[72] Inventors: Jesse C. Hood, Jr., 817 Dumaine Avenue, San Dimas, Calif. 91773; Harold D. Palmer, 25942 Corriente Lane, Mission Viejo, Calif. 92675

[22] Filed: Nov. 2, 1970

[21] Appl. No.: 86,206

[52] U.S. Cl. ....................29/203 H, 29/278

[51] Int. Cl. ....................H05k 13/04

[58] Field of Search.....29/278, 206, 203 H, 203 HM, 29/270

[56] References Cited

UNITED STATES PATENTS

| | | | |
|---|---|---|---|
| 3,579,795 | 5/1971 | Burman | 29/278 X |
| 3,535,763 | 10/1970 | Helton | 29/206 X |

*Primary Examiner*—Andrew R. Juhasz
*Assistant Examiner*—J. C. Peters
*Attorney*—Nilsson, Robbins, Wills & Berliner

[57] ABSTRACT

A tool is disclosed for use in placing and removing electrical components, as integrated circuit packages. A body, defining opposed substantially-parallel flat surfaces terminates in a slot for frictionally holding an integrated circuit package. A spring biased plunger engages the integrated circuit package either to force it into a circuit-board receptacle or for withdrawal therefrom. The tool is disclosed in an insertion form and in an integrated form for both insertion and withdrawal. In the withdrawal embodiment, the contact includes opposed jaws which are spring biased into the slot along with actuators for spreading the jaws.

6 Claims, 4 Drawing Figures

PATENTED OCT 24 1972

3,699,629

INVENTORS
JESSE C. HOOD, Jr.
HAROLD D. PALMER

BY

Nilsson, Robbins, Wills & Berliner
Attorneys.

ELECTRICAL COMPONENT INSERTION-REMOVAL TOOL

BACKGROUND AND SUMMARY OF THE INVENTION

Integrated circuit components or packages have come into wide-spread use to embody considerable electronic hardware in a small unit. Generally, these units are provided in the physical form of a small parallelepiped with two aligned rows of wire-terminal pins or prongs extending from one surface. Of course, as the units are of small physical size, the wire prongs are similarly small with the result that routine handling sometimes produces misalignment. Of course, unless the prongs are somewhat-precisely aligned, insertion into a receptacle is quite difficult.

Conventionally, integrated-circuit packages are placed in circuit boards and other base structures manually in the course of electrical assembly work. In view of the delicate nature of the units, and the possibility of prong misalignment, the placement of an integrated circuit package is sometimes a rather-difficult and precise manual operation. Accordingly, a need exists for an effective tool which is useful for placing integrated-circuit packages in a receptacle structure.

Generally, such a tool would ideally afford ease in aligning the terminals or prongs of the integrated-circuit package with the receptacle. Another desirable feature for such a tool is that it be usable by one hand, leaving the other hand free for other related work.

The problems of placing an integrated circuit package are also present in removing or withdrawing such a component from a receptacle. Additionally, in withdrawing an integrated circuit component there is an increased danger of breaking a wire prong or otherwise damaging the component. Consequently, a need exists for a simple, safe and reliable tool which may be conveniently employed, both to insert and remove integrated circuit components with reference to a receptacle structure.

In general, the present invention comprises a simple, hand-operated integrated circuit tool for seating and removing such packages. The body of the tool is of a somewhat-flat configuration to facilitate handling and alignment of the package. A gap is defined in the body for receiving an integrated-circuit package and a plunger mechanism is spring-biased to a retracted position and includes an actuator for pushing the plunger to move the package from the gap into a receptacle. In the incorporation of a removal structure into the tool, the plunger structure includes opposed jaws which are spring biased into the gap. Opposed actuators are also provided which may be forced together in one hand to spread the jaws as in releasing an integrated circuit package.

DESCRIPTION OF THE ILLUSTRATIVE EMBODIMENTS

Figures 1, 2, 3, 4, 5, 6:
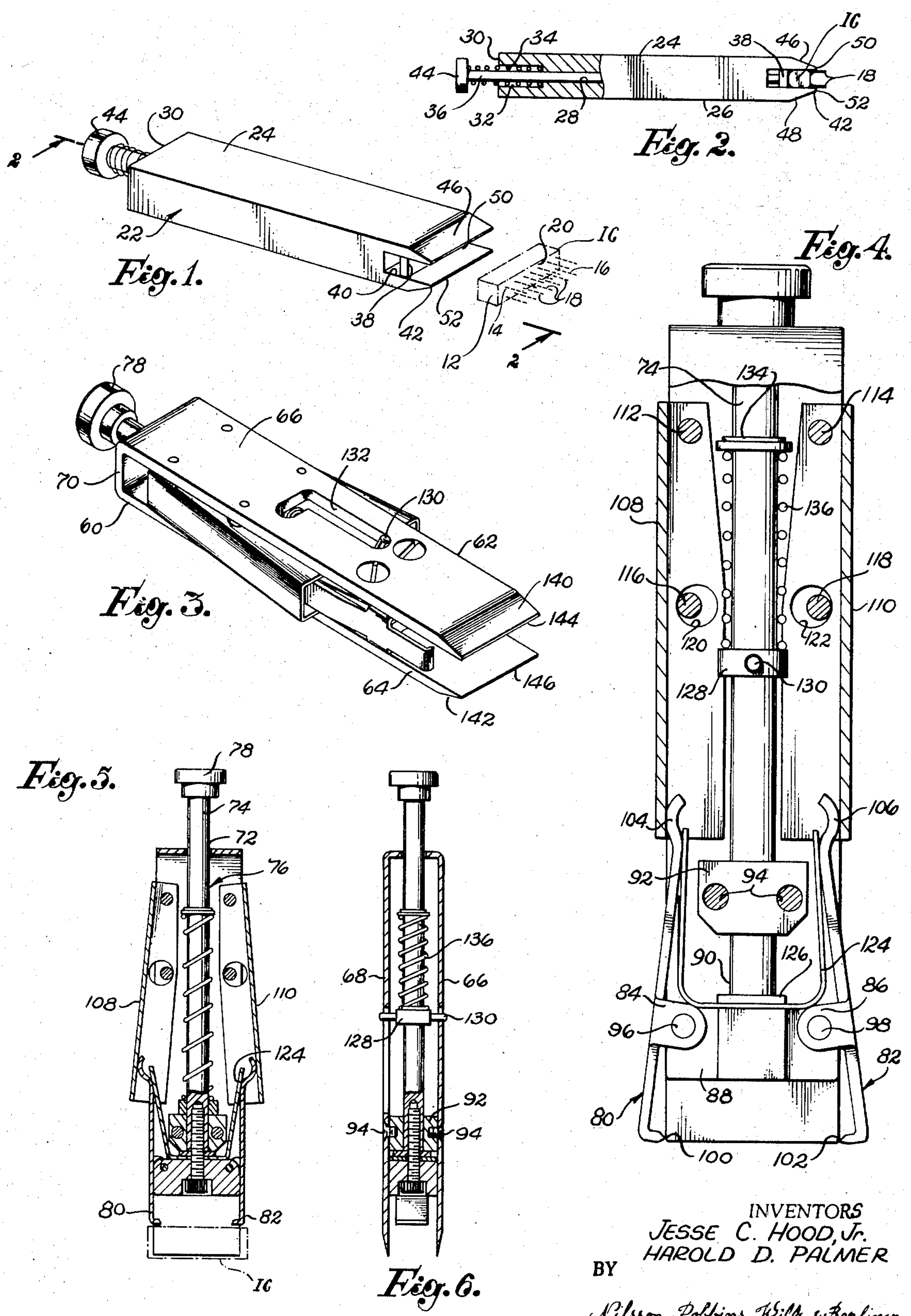
FIG. 1 is a perspective view of one embodiment of the present invention.
FIG. 2 is a partially sectioned view taken along line 2—2 of FIG. 1.
FIG. 3 is a perspective view of another embodiment of the present invention.
FIG. 4 is a horizontal co-planar sectional view through the structure of FIG. 3.
FIG. 5 is a sectional view similar to FIG. 4 showing the component in a different configuration and some component parts in section.
FIG. 6 is a vertical sectional view taken through the structure of FIG. 3.

As required, detailed illustrative embodiments of the invention are disclosed herein. The embodiments merely exemplify the invention which may, of course, be constructed in various other forms, some of which may be somewhat different from the disclosed illustrative embodiments. However, specific structural and functional details disclosed herein are merely representative and in that regard provide a basis for the claims herein which define the scope of the invention.

Referring initially to FIG. 1, there is shown (in phantom) an integrated circuit package IC which includes a body 12 of parallelepiped configuration and having two rows 14 and 16 of individual wire prongs 18 extending from a bottom surface 20. Conventional receptacle structures (not shown) receive the prongs 18 in clamped electrical-contact relationship. As indicated, the tool of the present invention is for placement and removal of an integrated circuit package IC.

In its simple form (FIG. 1) the tool hereof includes an elongate body 22 defining substantially flat opposed surfaces 24 and 26 (FIG. 2) so as to be conveniently held between opposed thumb and fingers when in use, providing an alignment reference. The elongate body 22 defines a central bore 28 extending lengthwise between the surfaces 24 and 26. At an upper end 30 of the body 22, the bore 28 is concentrically enlarged to define a cylindrical chamber 32 for receiving a coil spring 34. A plunger rod 36 of greater length than the body 22, passes coaxially through the spring 34 and the bore 28 to terminate at an integrated-circuit contact plate or plunger 38 which comprises a somewhat-flat block mated for movement through a gap 40 defined in parallel relationship with the surfaces 24 and 26 at a lower end 42 of the body 22.

The contact plunger 38 may be variously engaged to the rod 36 as by threads, press fit and so on. An actuator 44, in the form of a small disk, is similarly affixed to the end of the rod 36 that is remote from the contact plunger 38. The disk actuator 44 affords a push surface as for thumb engagement and additionally confines the spring 34 to remain within the chamber 32.

At the lower end of the body 22, the surfaces 24 and 26 terminate at opposed bevel surfaces 46 and 48 which taper inwardly to terminate in a pair of parallel knife edges 50 and 52 that are contiguous to the gap 40. The parallel alignment of the edges 50 and 52 with the plane surfaces 24 and 26 is a significant consideration in using the tool.

The tool as shown in FIGS. 1 and 2 may be formed by various manufacturing operations and may comprise metal, plastic or various other materials. The body 22 may be formed by drilling, shaping and/or molding operations after which the movable elements may be assembled therein using techniques well known in the manufacturing arts.

In using the tool as shown in FIGS. 1 and 2, the electronic component or package IC is matingly placed in the gap 40 with the prongs 18 extending substantially parallel to the surfaces 24 and 26. As indicated in FIG. 2, the knife edges 50 and 52 may engage the prongs 18 to align them in straight rows. It is to be noted that when the tool is loaded (contains a package IC) due to the action of the spring 34 holding the contact plunger 38 in a retracted position, the tool can be variously positioned without the plunger pushing the package IC from the gap 40.

To insert the package IC in a contact receptacle (not shown) the loaded tool is grasped by engaging the surfaces 24 and 26 between an opposed thumb and fingers, and in that regard the flat opposed surfaces afford the user considerable assistance in aligning the pins or prongs for insertion into a receptacle (not shown). Next, one of the rows is placed into initial engagement with a mating row of contacts in the receptacle (not shown) after which, a downward rolling motion over and toward the receptacle (not shown) moves the package IC into full engagement with the receptacle (not shown). The insertion operation is completed by depressing the disk actuator 44, which may be conveniently done by the index finger. As a consequence, the package IC is moved from the gap 40, completing its insertion with a uniform and distributed force.

Certain characteristics of the tool are significant to its ease of operation. Specifically, the opposed flat surfaces 24 and 26 in co-planar relationship with the gap 40 afford considerable assistance in aligning and inserting the package IC. The parallel knife edges 50 and 52 enable the user of the tool to observe the prongs 18 while they are held in alignment. The spring 34 avoids accidentally discharging a package IC from the loaded tool as a result of the weight of the movable plunger mechanism.

As indicated above, the need for an effective tool for the insertion of packages IC extends to include a like need for the capability to remove packages IC from a receptacle. In accordance with that need, a second embodiment hereof incorporates removal capability and will now be considered with reference to FIGS. 3, 4, 5 and 6. In view of the somewhat-different form of the individual components, fresh identification numerals are applied to all components of the second embodiment.

The body of the combination tool comprises a yoke 60 of U-shaped configuration with flat elongate parallel legs 62 and 64 defining opposed, substantially-flat parallel surfaces 66 and 68. The junction section 70, between the legs 62 and 64, defines a bore 72 for receiving a rod 74 of the movable actuator structure 76. An actuator knob 78 terminates the upper end of the rod 74 while the lower end terminates in a plunger comprised of a pair of jaws 80 and 82 which, as disclosed in detail below, function dually as a contact pusher and as a clamp structure.

The jaws 80 and 82 (FIG. 4) define flat "push" surfaces at their lower ends at well as perpendicular intermediately-located inward extensions 84 and 86 respectively which are pivotally affixed to a block 88 which is in turn affixed to the lower end 90 of the rod 74. Above the block 88, a bearing 92 (FIGS. 4 and 6) is journalled over the rod 74 and fixed to the yoke 60 to provide support for reciprocating motion of the actuator structure. The bearing 92 is affixed to the yoke 60 by screws 94. Thus, the actuator structure 76 carrying the block 88 may be freely reciprocated to move the jaws 80 and 82 from a retracted position (FIG. 5) to an extended position (FIG. 4).

In addition to the reciprocal motion of the jaws 80 and 82 (parallel to the surfaces 66 and 68), the jaws 80 and 82 may also be moved transversely, i.e. spread or closed, which motion that is accommodated by the pivotal mounting of the extensions 84 and 86 (FIG. 4). The pairs of extensions 84 and 86 (both sides of the block 88) receive press-fitted pins 96 and 98 respectively, which extend through the block 88 to enable a swinging movement of the jaws 80 and 82.

From the lower, facing knife edges 100 and 102 terminating the jaws 80 and 82, these structures extend upwardly to terminate in arcuate bearing section 104 and 106 respectively, which dwell within opposed, pivotally-mounted channels 108 and 110. Pivot pins 112 and 114 are press fitted or otherwise fixed into the yoke 60 extending through the channels 108 and 110 to allow pivotal motion thereof within the limitation defined by the similarly-affixed pins 116 and 118 extending through enlarged bores 120 and 122 transversely defined through the channels 108 and 110. Thus, as the channels 108 and 110 are squeezed together, as by grasping between an opposed thumb and fingers, the arcuate bearing sections 104 and 106 of the jaw structures 80 and 82 are moved inwardly thereby moving the knife edges 100 and 102 outwardly (disengagingly) as a result of the intermediate pivot on the pins 96 and 98.

The jaw structures 80 and 82 are spring biased to position the knife edges in the engaging positional relationship (FIG. 5) by an inverted U-shaped leaf-spring structure 124 which centrally receives the rod 74 and is locked in position contiguous to the block 88 by a collar 126. Another collar 128 receives the rod 74 in sliding relationship and includes radial extensions 130 (FIG. 3) for positional engagement in an L-shaped aperture 132 defined in the legs 62 and 64 of the yoke 60. Still another collar 134 is fixed to the rod 74 holding a coil spring 136 compressed against the collar 128.

The tool as shown in FIGS. 3–6 may be formed of various materials; however, one effective embodiment has been made of metal. Generally, the components may be preformed using various well-known metalworking techniques after which assembly within the yoke 62 is completed by placement of the screws 94 locking the internal operating components within the yoke 60 and the channels 108 and 110.

In the operation of the tool as depicted in FIGS. 3–6, the manipulations differ for inserting and withdrawing an integrated circuit package IC. The insertion of a package IC is accomplished in the manner similar to that described above and in that regard, beveled surfaces 140 and 142 (FIG. 3) defining knife edges 144 and 146, are quite significant.

In the placement of the package IC, the jaws 80 and 82 (FIG. 5) remain in their quiescent spring-urged inward or closed positions as the tool is grasped at the flat surfaces 66 and 68 (FIG. 6). The tool is loaded, as explained above, then one row of the contact prongs or pins of the package IC are started into a receptacle (not shown). When the package IC is aligned, depression of the actuator structure 76 moves the jaw structures 80 and 82 (FIG. 5) downward, to force the package IC into full engagement with the receptacle (not shown) after which the tool is lifted from the package IC. Thus, the use of the tool is substantially as described with reference to the structure of FIGS. 1 and 2.

In removing a package IC from a receptacle (not shown) the tool is grasped between opposed thumb and fingers at the channels 108 and 110, thereby compressing the channels and urging the arcuate sections 104 and 106 together, thus spreading the jaw structures 80 and 82 at the knife edges 100 and 102. Consequently, the tool may be lowered over an integrated-circuit package IC which is received between the legs 62 and 64 for positional alignment (indicated in phantom in FIG. 5).

With the channels 108 and 110 pivoted inwardly from the positions depicted in FIG. 5 to the positions depicted in FIG. 4 so as to clear the package IC, the actuator structure 76 is depressed by forcing the knob 78 downward, as with the index finger. Thus, the knife edges 100 and 102 (FIG. 4) are at the base of the package IC. Consequently, upon release of the channels 108 and 110, the knife edges 100 and 102 move to seat under the edges of the package IC under the force of the leaf-spring structure 124. With the jaw structures 80 and 82 so engaged, the knob 78 is next released allowing the jaw structures 80 and 82 to raise under the force of the spring 136 thereby withdrawing the package IC with a straight and distributed force. Of course, in some applications a manual lifting force may also be required.

The withdrawal of the package IC from a receptacle normally requires an increased spring force over that provided by the spring 136 during usual insertion use. To accomplish such additional spring bias, the collar 128 (FIG. 4) is raised and turned so that the extensions 130 are locked in the horizontal leg of the aperture 132 (FIG. 3). As a consequence, the spring 136 is compressed to exert an increased lifting force on the actuator 76.

In view of the above, it is to be appreciated that the basic insertion structure is afforded in combination with a removal structure both functioning to afford an improved, economical, and effective tool.

We claim:

1. A tool for use in association with terminal pin-bearing electrical components, as integrated circuit packages, comprising:

a body member defining manual holding surfaces and a slot at one end thereof to matingly receive one of said electrical components;

a plunger member extending through said body member and including a manual actuator means extending out of said body at a location remote from said slot-defining portion of said body.

a contact member affixed to said plunger member to be movable from a retracted position to a clearing position to thereby force one of said electrical components from said slot in said body member; and engaging means including a pair of opposed jaws positioned at the ends of said slot defined in said body member, for engaging one of said electrical components and further including handle means for actuating said jaws in relation to said gap.

2. A tool according to claim 1 including spring means for positioning said plunger member with reference to said body member.

3. A tool according to claim 2 wherein said spring means comprises a coil spring and wherein said coil spring is mounted concentrically on said plunger member.

4. A tool according to claim 1 wherein said holding surfaces defined by said body member comprise substantially parallel flat surfaces in coplanar relationship to said slot.

5. A tool according to claim 1 wherein said body member defines a pair of substantially flat opposed surfaces so as to be held between opposed thumb and fingers when in use, providing an alignment reference.

6. A tool for use in placing electrical components having aligned rows of terminal prongs, as integrated circuit packages, comprising:

a body member defining a pair of substantially flat opposed surfaces so as to be held between opposed thumb and fingers to provide an alignment reference, said body member further defining a slot at one end extending coplanar between said opposed surfaces, for receiving one of said electrical components, in aligned relationship with said rows;

a plunger member extending through said body member and including a manual actuator means extending out of said body at a location remote from said slot-defining portion of said body;

a contact member affixed to said plunger member to be movable from a retracted position to a clearing position to thereby force one of said electrical components from said slot in said body member; and spring means for positioning said plunger member with reference to said body member.

* * * * *